United States Patent
Meyer

(10) Patent No.: US 10,571,196 B2
(45) Date of Patent: Feb. 25, 2020

(54) VEHICLE COOLING SYSTEM WITH CHARGE AIR COOLING

(71) Applicant: AGCO International GmbH, Neuhausen (CH)

(72) Inventor: Laurent Meyer, Beauvais (FR)

(73) Assignee: AGCO International GmbH, Neuhausen (CH)

( * ) Notice: Subject to any disclaimer, the term of this patent is extended or adjusted under 35 U.S.C. 154(b) by 42 days.

(21) Appl. No.: 15/557,326

(22) PCT Filed: Mar. 14, 2016

(86) PCT No.: PCT/EP2016/055468
§ 371 (c)(1),
(2) Date: Sep. 11, 2017

(87) PCT Pub. No.: WO2016/146592
PCT Pub. Date: Sep. 22, 2016

(65) Prior Publication Data
US 2018/0051933 A1    Feb. 22, 2018

(30) Foreign Application Priority Data
Mar. 16, 2015   (EP) .................................... 15290074

(51) Int. Cl.
*F28D 1/04* (2006.01)
*F02B 29/04* (2006.01)
(Continued)

(52) U.S. Cl.
CPC ............ *F28D 1/0452* (2013.01); *B60K 11/02* (2013.01); *F02B 29/0431* (2013.01); *B60Y 2200/221* (2013.01); *F28D 2021/0082* (2013.01)

(58) Field of Classification Search
CPC ....... B60K 11/02; B60K 11/04; F28D 1/0452; F28D 2021/0082; F28F 13/06; F01P 3/20;
(Continued)

(56) References Cited

U.S. PATENT DOCUMENTS 2,350,784 A * 6/1944 Lohner ............... F02B 29/0456
123/41.56
4,075,991 A   2/1978 Mettig et al.
(Continued)

FOREIGN PATENT DOCUMENTS

CN     104121086 A   10/2014
DE      3200682 A1    7/1983
(Continued)

OTHER PUBLICATIONS

UK Intellectual Property Office, International Search Report for Related UK Application No. GB1505630.2, dated Sep. 22, 2015.
(Continued)

*Primary Examiner* — Ljiljana V. Ciric

(57) ABSTRACT

A cooling package for a vehicle, such as an agricultural tractor, having a heat exchanger with a fan providing air flow and a charge air cooler assembly that airflow is routed through multiple times in order to cool a compressed charge of air. As the temperature rise experienced by the cooling airflow is relatively minor compared to the initial temperature of the compressed charge of air, the airflow is initially routed through an outlet-side portion of the charge air cooler to cool the compressed charge of air towards the outlet side of the charge air cooler, and subsequently routed through an inlet-side portion of the charge air cooler to cool the compressed charge of air towards the inlet side of the charge air cooler.

11 Claims, 6 Drawing Sheets

(51) Int. Cl.
*B60K 11/02* (2006.01)
*F28D 21/00* (2006.01)

(58) Field of Classification Search
CPC .... F01P 3/18; F01P 2003/182; F01P 2060/02; F02B 29/0431; B60Y 2200/221; Y02T 10/146
See application file for complete search history.

(56) References Cited

U.S. PATENT DOCUMENTS

| | | | |
|---|---|---|---|
| 4,236,492 A | 12/1980 | Tholen | |
| 4,317,439 A * | 3/1982 | Emmerling | F01P 3/20 123/563 |
| 4,651,816 A * | 3/1987 | Struss | F28F 9/002 165/140 |
| 4,736,727 A * | 4/1988 | Williams | B60K 11/04 123/41.31 |
| 5,097,891 A * | 3/1992 | Christensen | F02B 29/0456 123/563 |
| 5,669,338 A * | 9/1997 | Pribble | F01P 7/165 123/41.29 |
| 6,129,056 A | 10/2000 | Skeel et al. | |
| 6,293,264 B1 * | 9/2001 | Middlebrook | F02B 29/0462 123/184.21 |
| 6,354,096 B1 * | 3/2002 | Siler | F01P 7/048 236/35.3 |
| 7,178,579 B2 * | 2/2007 | Kolb | F02B 29/0412 123/563 |
| 7,228,885 B2 * | 6/2007 | Kolb | B60H 1/00328 123/563 |
| 8,186,159 B2 * | 5/2012 | Martins | F01P 1/06 123/562 |
| 8,985,198 B2 * | 3/2015 | Braun | F02B 29/0462 165/149 |
| 9,038,609 B2 * | 5/2015 | Meshenky | F02B 29/0462 123/184.21 |
| 9,038,610 B2 * | 5/2015 | Meshenky | F02M 35/112 123/184.21 |
| 9,528,428 B2 * | 12/2016 | Appleton | F02B 29/0475 |
| 2004/0104007 A1 * | 6/2004 | Kolb | B60K 11/02 165/41 |
| 2005/0109485 A1 * | 5/2005 | Kolb | B60H 1/00328 165/42 |
| 2008/0169092 A1 * | 7/2008 | Kardos | F02B 29/0418 165/157 |
| 2010/0229548 A1 * | 9/2010 | Kardos | F02B 29/0431 60/599 |
| 2011/0011665 A1 * | 1/2011 | Peterson | F01N 3/055 180/309 |
| 2015/0047818 A1 | 2/2015 | Peskos et al. | |
| 2019/0135084 A1 * | 5/2019 | Sato | B60K 11/04 |

FOREIGN PATENT DOCUMENTS

| | | |
|---|---|---|
| DE | 4431107 C1 | 2/1996 |
| DE | 10062534 A | 7/2001 |
| EP | 0952024 A2 | 10/1999 |
| EP | 1048832 A1 | 11/2000 |
| EP | 1496214 A1 | 1/2005 |
| EP | 2757033 A1 | 7/2014 |
| GB | 1033181 A | 6/1966 |
| GB | 2500871 A | 10/2013 |
| WO | 2013/087562 A1 | 6/2013 |

OTHER PUBLICATIONS

European Patent Office, International Search Report for Parent PCT Application No. PCT/EP2016/055468, dated Sep. 13, 2016.

\* cited by examiner

VEHICLE COOLING SYSTEM WITH CHARGE AIR COOLING

BACKGROUND OF THE INVENTION

Field of the Invention

The present invention relates to a cooling system for a vehicle, preferably a cooling system having a charge air cooler, and a vehicle, preferably an agricultural tractor, having such a cooling system.

Description of Related Art

Charge air coolers are used as part of vehicle cooling systems to cool a compressed charge of air received from a turbocharger, before the cooled compressed charge of air is passed to the engine. Charge air coolers are generally constructed having an inlet to receive the compressed charge and an outlet to deliver the cooled compressed charge, wherein the compressed charge is cooled as it passes through the charge air cooler. The charge air cooler is usually air-cooled via an engine cooling fan.

In vehicles, the arrangement and dimensions of engine fans and associated heat exchangers are often dictated by the space available in and around the engine installation. Furthermore, consideration must be given to the order of coolers with respect to the air stream passage. Those coolers furthest upstream will experience cooler air than those disposed further downstream. Consideration must also be given to the venting of the air stream which is often heated by several degrees Celsius.

In some installations the fan is disposed downstream of the various coolers, thus effectively pulling the airstream through the coolers and venting the warmed air immediately after the fan. In utility vehicles, and agricultural tractors in particular, the cooling package is often disposed immediately in front of the internal combustion engine. The cooling airflow is drawn in through the front grill of agricultural tractors and directed in a generally rearward direction with respect to the direction of travel. The cooling airflow is vented therefore in a generally rearward direction towards the engine.

There is a continuous drive to improve efficiencies of cooling system components, and to maximise the utilisation of space within the engine compartment of vehicles. In addition efforts have been made in the past to direct the heated air away from the engine to minimize undesirable heating thereof. For example, baffle plates mounted immediately in front of the engine are known to direct the cooling airflow outwardly venting through the sides of the engine compartment.

It is an object of the invention to address the above issues.

SUMMARY OF THE INVENTION

Accordingly, there is provided a cooling system assembly having a heat exchanger, the heat exchanger comprising:
an inlet to receive a fluid to be cooled;
an outlet to provide a cooled fluid; and
a plurality of parallel flow paths for flow of fluid between the inlet and the outlet, the plurality of parallel flow paths defining an inlet-side portion and an outlet-side portion of the heat exchanger,
wherein the cooling system assembly is arranged to receive a coolant, the coolant initially routed through an outlet-side portion of the heat exchanger to cool the fluid in the portion of the flow paths in the region of the outlet, the coolant subsequently routed through an inlet-side portion of the heat exchanger to cool the fluid in the portion of the flow paths in the region of the inlet.

In a particularly preferred embodiment, there is provided a charge air cooler assembly having a charge air cooler (CAC), the CAC comprising:
an inlet to receive a compressed charge of air;
an outlet to provide a cooled compressed charge of air for an engine; and
a plurality of parallel flow paths for flow of a compressed charge of air between the inlet and the outlet, the plurality of parallel flow paths defining an inlet-side portion and an outlet-side portion of the CAC,
wherein the charge air cooler assembly is arranged to receive a coolant, the coolant initially routed through an outlet-side portion of the CAC to cool the compressed charge of air in the portion of the flow paths in the region of the outlet, the coolant subsequently routed through an inlet-side portion of the CAC to cool the compressed charge of air in the portion of the flow paths in the region of the inlet.

The CAC receives a compressed charge of air, preferably from a turbocharger or a supercharger, to be used in an engine. As the temperature of the compressed charge of air at the outlet region of the CAC is lower than at the inlet region, coolant used to initially cool the outlet-side flow can subsequently be used to cool the inlet-side flow. The coolant will experience a rise in temperature from cooling the outlet-side flow, but the relatively-warmer coolant will remain at a temperature where it can cool the high-temperature inlet-side flow. The temperature of the compressed charge of air may be of the order of 200 degrees C. at the inlet of the CAC, and approximately 50 degrees C. at the outlet. Accordingly, while the coolant flow will experience an increase in temperature when cooling the outlet-side flow of charge air, as such a temperature increase will be relatively minor—typically of the order of 10 degrees C.—the coolant may still be effectively used to cool the inlet-side flow of charge air. Preferably, the coolant is atmospheric air.

The system of the invention, wherein the CAC is configured as a multi-pass CAC, provides several advantages over prior art systems. Firstly, as the coolant flow is routed such that the same flow of coolant is used twice to cool the flow of charge air, only a single fan and a single charge air cooler may be required to achieve the desired cooling of the charge air. Accordingly, the efficiency of the charge air system is increased. Coolant air from the first pass through the CAC is still cold enough to be re-used in a second pass through the CAC or any other cooler. This allows the exchange of more power to the coolant than with a single-pass CAC. In addition, the pressure drop across the assembly may be reduced due only a single charge air cooler being used, compared to prior art systems using multiple charge air coolers. Furthermore, less physical space is taken up by the assembly, due to a reduction in the number of components.

Preferably, the charge air cooler assembly comprises a flow duct, the flow duct arranged to route coolant from an outlet-side portion of the CAC to an inlet-side portion of the CAC.

The coolant initially flows through the CAC via the inlet-side portion, and subsequently re-flows through the CAC via the outlet-side portion. The flow duct may comprise any suitable arrangement of ducts, shrouds or baffles which are configured to direct a flow of coolant through the outlet-side portion of the CAC and to subsequently direct the flow of coolant through the inlet-side portion of the CAC.

It will be further understood that the charge air cooler assembly may comprise multiple flow ducts, wherein coolant may be passed through the CAC a plurality of times to successively cool separate portions of the plurality of parallel coolant flow paths, the separate portions arranged in sequence going from the outlet side of the CAC towards the inlet side of the CAC.

There is further provided a cooling package for a vehicle, comprising at least one heat exchanger;

a fan arranged to create a flow of air through the at least one heat exchanger; and a charge air cooler assembly as described above, wherein the fan is arranged to create a flow of air initially through the outlet-side portion of the CAC and subsequently through the inlet-side portion of the CAC, in parallel to the flow of air through the at least one heat exchanger.

Providing the CAC as part of a vehicle cooling package allows for the fan of the vehicle cooling package to be used to generate airflow through the CAC. Accordingly, the need for an additional fan for the operation of the CAC is removed.

The fan of the cooling package is used to create a flow of air. It will be understood that the fan may be arranged to blow and/or draw air through the various components of the cooling package. The fan may comprise a reversible fan, and/or a variable pitch fan, such that the flow of air through the cooling package may be reversed, e.g. to perform a cleaning of the components of the cooling package.

Preferably, the charge air cooler assembly comprises a flow duct, wherein the flow duct is arranged to route coolant from an outlet-side portion of the CAC to an inlet-side portion of the CAC. In a preferred aspect, the flow duct forms part of a shroud for the fan.

Preferably, the cooling package comprises an engine radiator as a heat exchanger.

In a particularly preferred embodiment, the cooling package comprises a first heat exchanger arranged upstream of the fan;

a second heat exchanger located downstream of the fan; and a CAC in fluid connection with the fan, the CAC arranged in parallel to the first and second heat exchangers.

Preferably, the CAC is located laterally adjacent to a flow path defined between the first and second heat exchangers.

The cooling package may comprise a first heat exchanger in the form of an engine radiator, and a second heat exchanger in the form of a cooler for transmission oil, a HVAC system, etc. The cooling package is arranged to form a flow path through the various heat exchangers for the cooling of the contained fluids. The CAC is located in parallel with this flow path, to make use of the single fan of the cooling package.

In one embodiment, the fan is located upstream of the outlet-side portion of the flow paths of the CAC assembly, the fan arranged to blow a flow of air through the outlet-side portion of the CAC, the flow of air subsequently routed to flow through the inlet-side portion of the CAC.

In an alternative embodiment, the fan is located downstream of the inlet-side portion of the flow paths of the CAC assembly, the fan arranged to draw a flow of air through the outlet-side portion of the CAC, the flow of air subsequently routed to flow through the inlet-side portion of the CAC.

In a preferred embodiment, the fan is located downstream of the outlet-side portion of the CAC and upstream of the inlet-side portion of the CAC, the fan arranged to draw a flow of air through the outlet-side portion of the CAC and to subsequently blow the flow of air through the inlet-side portion of the CAC.

In this embodiment, the fan may be arranged adjacent to the CAC. Positioning the CAC adjacent to the fan allows for the space requirements of the cooling package to be minimised. Preferably, the fan is arranged perpendicular to the CAC.

Preferably, the fan is arranged such that a portion of the fan swept area extends into the space defined by a flow duct arranged adjacent the CAC.

The cooling package is configured such that a portion of the fan juts clear of a projection of the at least one heat exchanger, wherein the projecting portion of the fan is arranged adjacent the CAC. As the fan is located to extend into a flow duct located adjacent the CAC, accordingly the flow generated by the fan in this area can be redirected to primarily cool the CAC.

Preferably, the flow duct is arranged to route coolant flowing through an outlet-side portion of the CAC to flow through an inlet-side portion of the CAC.

Preferably, the fan is located off-centre to a flow path through the at least one heat exchanger, the fan located close to the CAC, such that a first portion of the flow generated by the fan flows through the first and second heat exchangers, and a second portion of the flow generated by the fan flows through the CAC.

Adjusting the location of the fan from a position in line with the centre of the heat exchanger to a position wherein a portion of the flow generated by the fan is passed through the CAC allows for the use of standard fan elements, without the need for a significant redesign of cooling package components.

There is also provided a vehicle, preferably an agricultural vehicle such as an agricultural tractor, comprising a charge air cooler assembly as described above, or comprising a cooling package having a charge air cooler assembly as described above.

Preferably, the fan of the cooling package is arranged such that the rotational axis of the fan is transverse to the longitudinal axis of the vehicle, extending between the front and the rear of the vehicle.

Such a longitudinal arrangement of the cooling package can present advantages including a reduction of vehicle width at the location of the cooling package presenting improved operator visibility, as well as more efficient management of airflow and cooling effects on the engine.

Preferably, the first and second heat exchangers are arranged parallel to the fan along the longitudinal axis of the vehicle, and wherein the CAC is arranged in series with the fan along the longitudinal axis of the vehicle.

Preferably, the vehicle comprises an engine and a cab section, wherein the cooling package is arranged between the engine and the cab section.

There is also provided a vehicle, preferably an agricultural vehicle such as an agricultural tractor, the vehicle having a longitudinal axis extending between the front and the rear of the vehicle, the vehicle comprising:

an engine;

a cab located rear of the engine; and a cooling package located between the engine and the cab, the cooling package comprising a fan and at least one heat exchanger, the fan and at least one heat exchanger each having a major axis arranged parallel to the longitudinal axis of the vehicle, the cooling package arranged to generate a flow of air through the at least one heat exchanger in a direction transverse to the longitudinal axis of the vehicle, wherein the cooling package further comprises at least one charge air cooler (CAC), the CAC arranged adjacent to the fan, wherein the CAC has a major axis arranged transverse to the longitudinal axis of the vehicle.

Arranging the components of the cooling package in such a manner allows for an efficient and effective use of the available space on the vehicle, providing for improved operator visibility and transverse airflow through the cooling package.

In one embodiment, the CAC is positioned between the fan and the cab. In an alternative embodiment, the CAC is positioned above or below the fan and the at least one heat exchanger.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
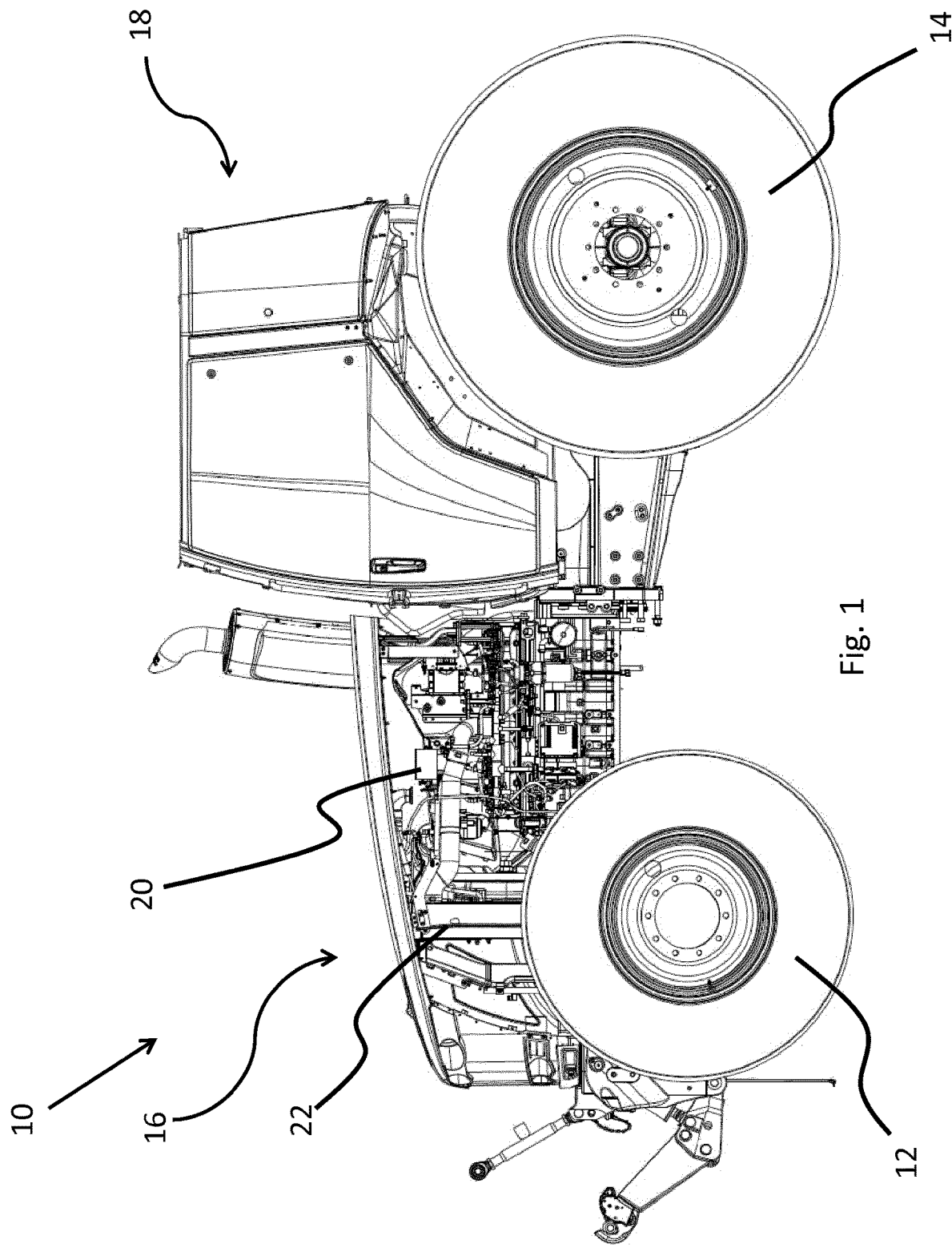
FIG. 1 is a side plan view of an agricultural tractor according to an embodiment of the invention.

In FIG. 1, an agricultural tractor is indicated at 10. The tractor 10 comprises front wheels 12, rear wheels 14, an engine section 16 and a cab section 18. An engine 20 is provided in the engine section 16, with a cooling package 22 located adjacent the engine 20.

The tractor 10 comprises an Engine Control Unit (ECU, not shown), which is configured to control the operation of the engine 20 of the tractor 10, as well as any additional vehicle systems, based on input received from the tractor operation and/or any tractor sensor systems.

Figure 2:
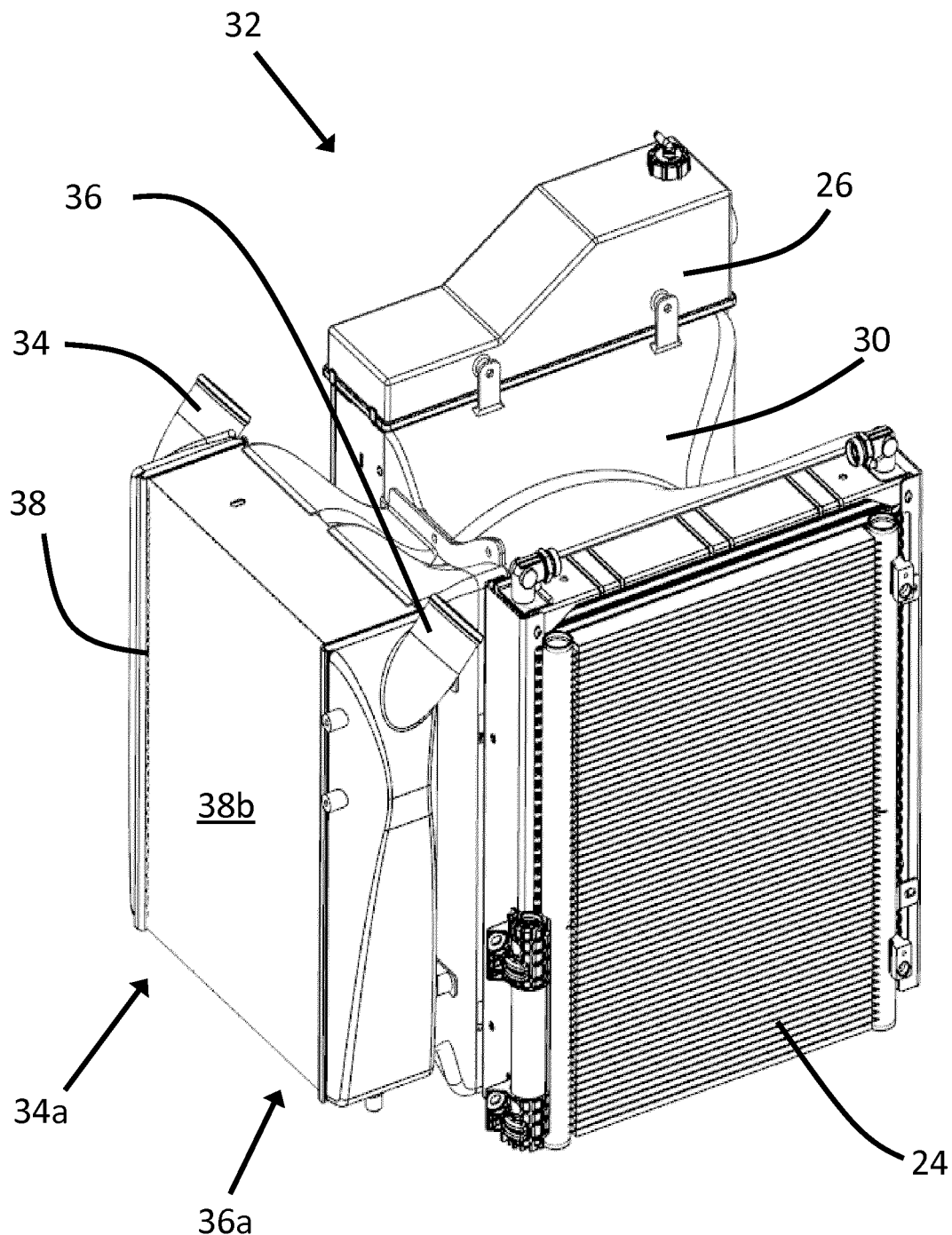
FIG. 2 is an isometric perspective view of a cooling package of the tractor of FIG. 1.

A cooling package 22 is illustrated in FIG. 2. The cooling package 22 comprises a first heat exchanger assembly 24, a second heat exchanger assembly 26, and an engine fan (28, FIG. 3) arranged between the first and second heat exchanger assemblies 24, 26. The fan 28 is arranged such that a first side 28a of the fan faces the first heat exchanger assembly 24, and a second side 28b of the fan 28 faces the second heat exchanger assembly 26. The fan 28 is configured to rotate to draw in air through the first heat exchanger assembly 24 and to expel the air out through the second heat exchanger assembly 26, as indicated by the respective sets of arrows A,B shown in the cross-sectional view of FIG. 3. It will be further understood that the fan 28 may further be configured to rotate in a reverse direction, and/or to have reversible fan blades, such that a reverse air flow through the heat exchangers 24,26 can be facilitated, e.g. for cleaning of accumulated dust and debris. The cooling package 22 further comprises a duct or cowling 30 arranged to route air between the first and second heat exchanger assemblies 24,26 through the fan 28.

A charge air cooler (CAC) assembly 32 is arranged to one side of the fan 28, the CAC assembly 32 oriented substantially parallel to the rotational axis of the fan 28. The CAC assembly 32 receives a compressed charge of air, preferably from a turbocharger or a supercharger (not shown), preferably to be used in the engine 20. The CAC assembly 32 comprises an inlet 34 for receiving a hot compressed charge of air and an outlet 36 for providing a cooled compressed charge of air, the inlet 34 and outlet 36 arranged either side of a body portion 38 of the CAC assembly 32. An array of flow paths 39 are arranged in the body 38 of the CAC assembly 32, the flow paths running in parallel between the inlet 34 and the outlet 36. The flow paths 39 may comprise a plurality of flow tubes or ducts connecting the inlet 34 and the outlet 36. The CAC assembly 32 is arranged to allow for cooling air to flow through the body 38 of the CAC assembly 32, to cool the compressed charge of air carried in the flow paths 39 of the body 38.

The duct 30 of the cooling package 22 is coupled with the CAC assembly 32, such that a first face 38a of the body 38 of the CAC assembly 32 is open to the interior of the cooling package 22, the body of the CAC assembly 32 further comprising a second opposed face 38b. The CAC assembly 32 is positioned such that the midpoint of the flow paths between the inlet 34 and the outlet 36 is substantially in line with the lateral axis of the fan 28, such that an outlet-side section 36a of the flow paths of the CAC assembly 32 are arranged to the first side 28a of the fan 28, and an inlet-side section 34a of the flow paths of the CAC assembly 32 are arranged to the second side 28b of the fan 28.

In addition to the airflow A,B through the first and second heat exchanger assemblies 24,26, the fan 28 is operable to generate an airflow through the body 38 of the CAC assembly 32. During normal rotation, the fan 28 is arranged such that airflow is initially drawn in through the outlet-side section 36a of the CAC assembly 32 (as indicated by arrow X), then passes through the fan 28, and is then routed out through the inlet-side section 34a of the CAC assembly 32 (as indicated by arrow Y).

As the temperature of the compressed charge of air at the outlet-side section 36a of the CAC is lower than at the inlet-side section 34a, a coolant used to initially cool the outlet-side flow can subsequently be used to cool the inlet-side flow. The coolant will experience a rise in temperature from cooling the outlet-side flow, but the relatively-warmer coolant will still remain at a temperature where it can cool the high-temperature inlet-side flow. The temperature of the compressed charge of air may be of the order of 200 degrees C. at the inlet 34 of the CAC, and approximately 50 degrees C. at the outlet 36. Accordingly, while the coolant flow will experience an increase in temperature when cooling the outlet-side flow of charge air, as such a temperature increase will be relatively minor—typically of the order of 10 degrees C.—the coolant may still be effectively used to cool the inlet-side flow of charge air.

This arrangement of the cooling package 22 with the CAC assembly 32 provides a multi-pass charge air cooler, with results in several advantages when compared to prior art systems. Firstly, as the coolant flow is routed such that the same flow of coolant is used twice to cool the flow of charge air, only a single fan and a single charge air cooler may be required to achieve the desired cooling of the charge air. Accordingly, the efficiency of the charge air system is increased. Furthermore, coolant from the first pass through the CAC is still cold enough to be re-used in a second pass through the CAC, or any other cooler. This allows for the exchange of more power via the coolant when compared to a single-pass CAC. Additionally, the pressure drop across the assembly may be reduced due to only a single charge air cooler being used, compared to prior art systems using multiple charge air coolers. In a further advantage, less physical space is taken up by the assembly, due to a reduction in the number of components.

The flow of air into and out of the second face 38b of the CAC assembly 32 may be facilitated using additional vents or grilles provided in the housing of the vehicle, where such additional vents or grilles may be oriented perpendicularly to existing vents or grilles used for flow of air into the cooling package 22.

Figure 3:
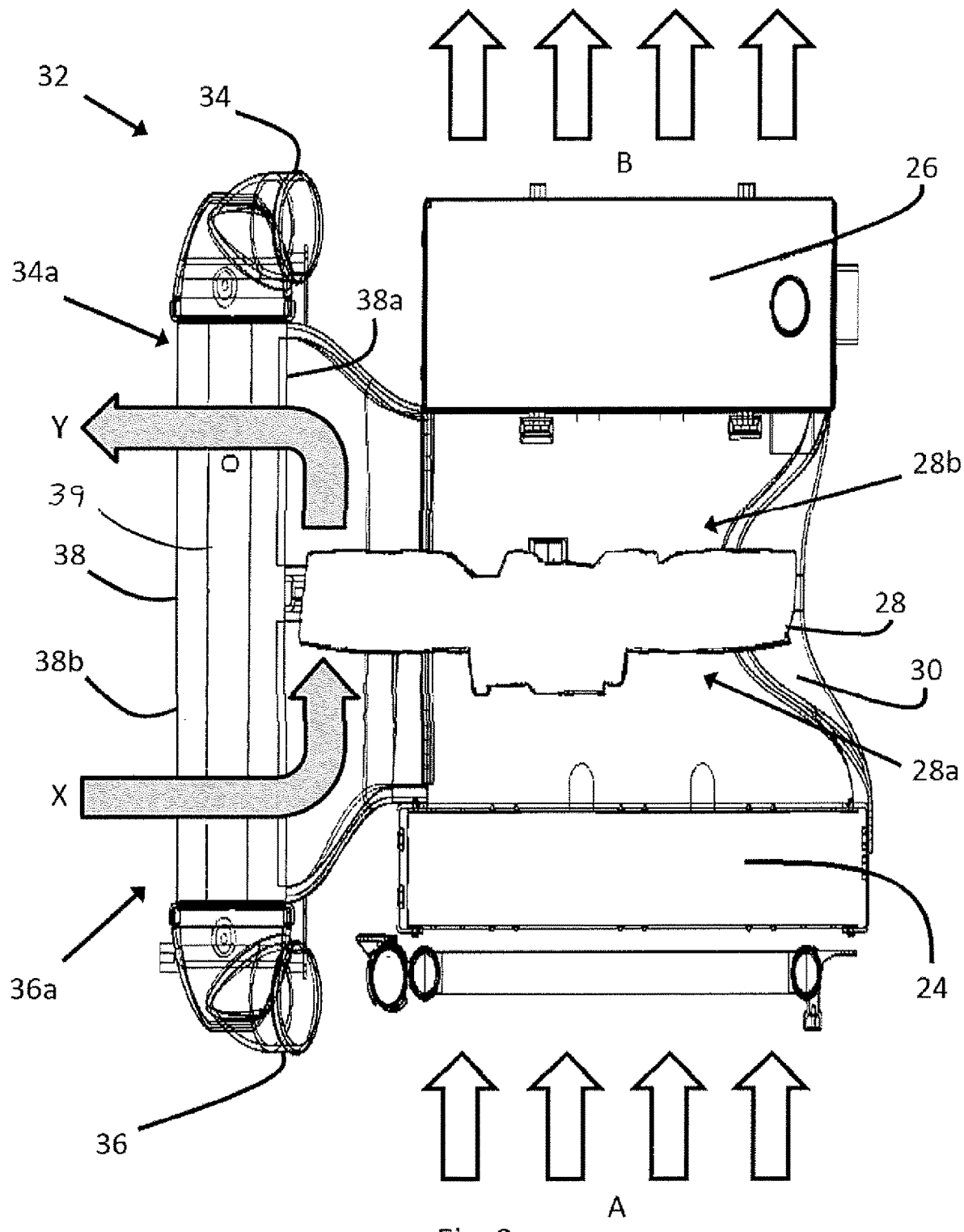
FIG. 3 is a top-down cross-sectional view of the cooling package of FIG. 2, according to a first embodiment of the invention.

The embodiment of FIGS. 2 and 3 illustrates a configuration wherein the CAC assembly 32 is positioned to the side of the cooling package 22, effectively resulting in an airflow through the CAC assembly 32 parallel to the flow of air through the cooling package 22 itself. It will be understood that further embodiments may be provided wherein the CAC assembly 32 is positioned upstream or downstream of the flow of air through a cooling package. Schematic examples of such embodiments are provided in FIGS. 4 and 5.

Figure 4:
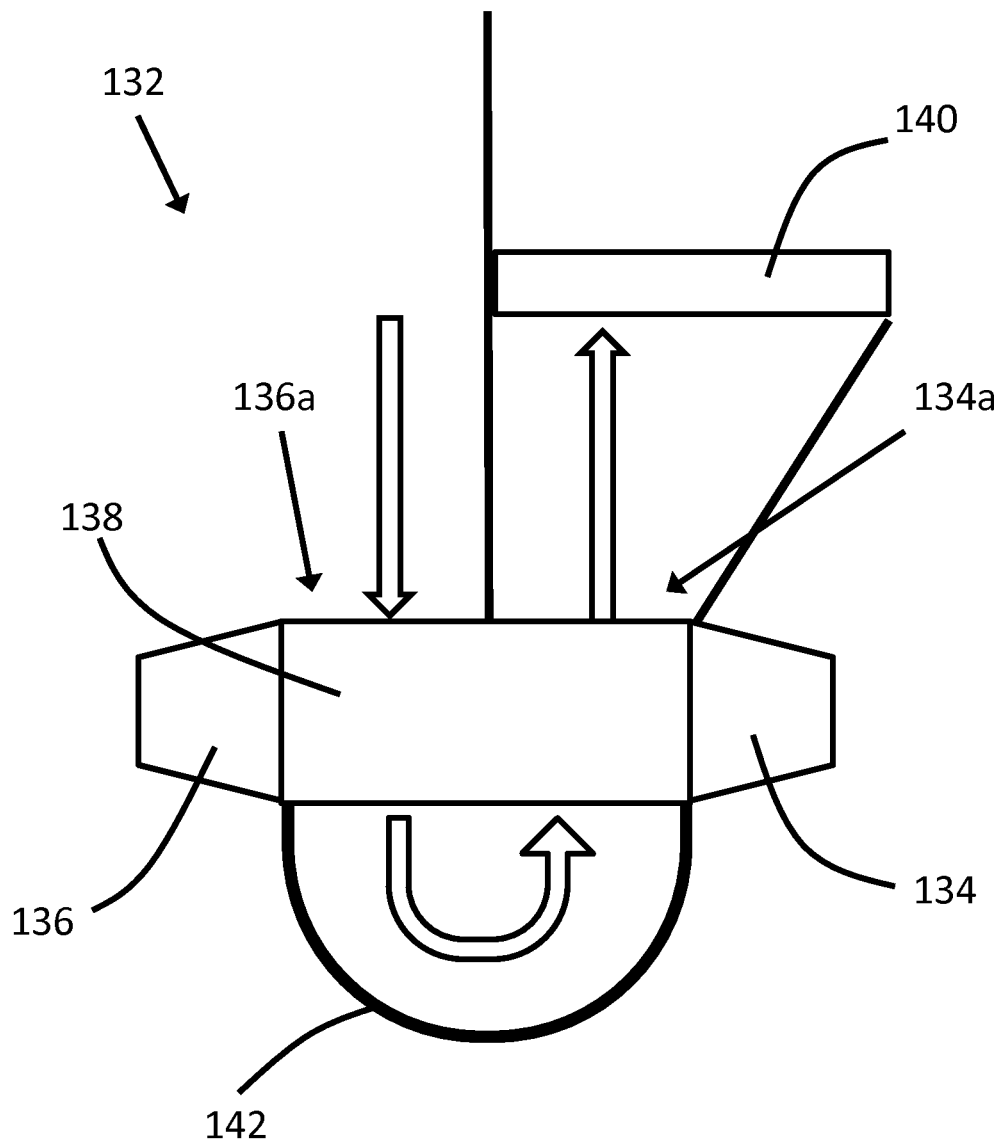
FIG. 4 is an illustrative view of a cooling package according to a second embodiment of the invention.

With reference to FIG. 4, a charge air cooler (CAC) assembly 132 is provided having an inlet 134, an outlet 136, and a body 138 extending therebetween, a plurality of parallel flow paths (not shown) arranged in the body 138 to provide for the flow of a compressed charge of air from the inlet 134 to the outlet 136. A fan 140 is coupled with the CAC assembly 132 via airflow ducts 142. The ducts 142 are arranged such that a flow path is defined through the body 138 of the CAC assembly 132, wherein airflow is initially routed through an outlet-side section 136a of the body 138 before subsequently being routed through an inlet-side section 134a of the body 138.

The fan 140 is located downstream of the CAC assembly 132, with regard to the normal direction of airflow through the fan 140. During operation, the fan 140 is configured to draw in air initially through the outlet-side section 136a of the body 138 and subsequently through the inlet-side section 134a, as indicated by the arrows. The airflow can then be routed to other cooling packages as required (not shown).

Figure 5:
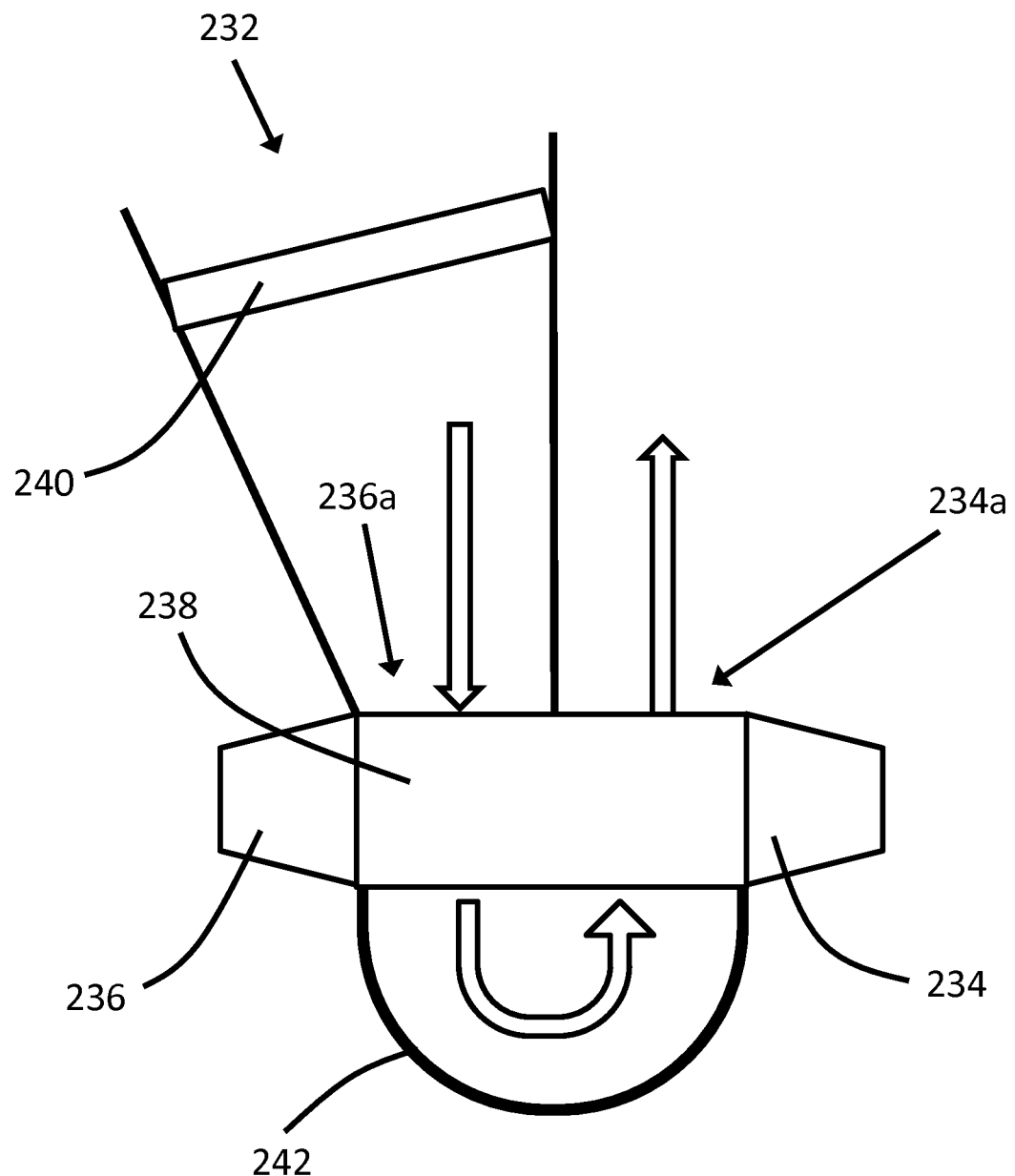
FIG. 5 is an illustrative view of a cooling package according to a third embodiment of the invention.

Similarly, FIG. 5 illustrates a comparable construction, wherein similar components are indicated via corresponding reference numerals, increased by 100. In the embodiment of FIG. 5, the fan 240 is located upstream of the CAC assembly 232, and coupled to the CAC assembly 232 via appropriate ducts 142. The fan 240 is accordingly arranged to blow air initially through the outlet-side section 136a of the body 138 and subsequently through the inlet-side section 134a, as indicated by the arrows. The airflow through the fan 140 may be initially drawn through other cooling packages as required (not shown).

The example embodiments of FIGS. 4 and 5 operate on the same principle as that of the embodiment of FIGS. 2 and 3, in that a cooling airflow may be routed multiple times through the body of the CAC to cool the compressed charge of air, the airflow initially passing through the CAC towards the outlet side of the CAC and subsequently routed through the CAC towards the inlet side of the CAC.

In the embodiment shown in FIG. 1, the cooling package 22 is provided at the front of the tractor 10, forward of the engine 20. In addition, the fan 28 of the cooling package 22 is aligned such that the rotational axis of the fan 28 is in line with and parallel to the longitudinal or front-rear axis of the tractor 10. In a further aspect of the invention, the charge air cooler assembly may be incorporated into different vehicle component configurations. In a particularly preferred embodiment, the charge air cooler assembly is provided as part of a cooling package having a fan, wherein the rotational axis of the fan is transverse to the longitudinal axis of the associated vehicle.

Figure 6:
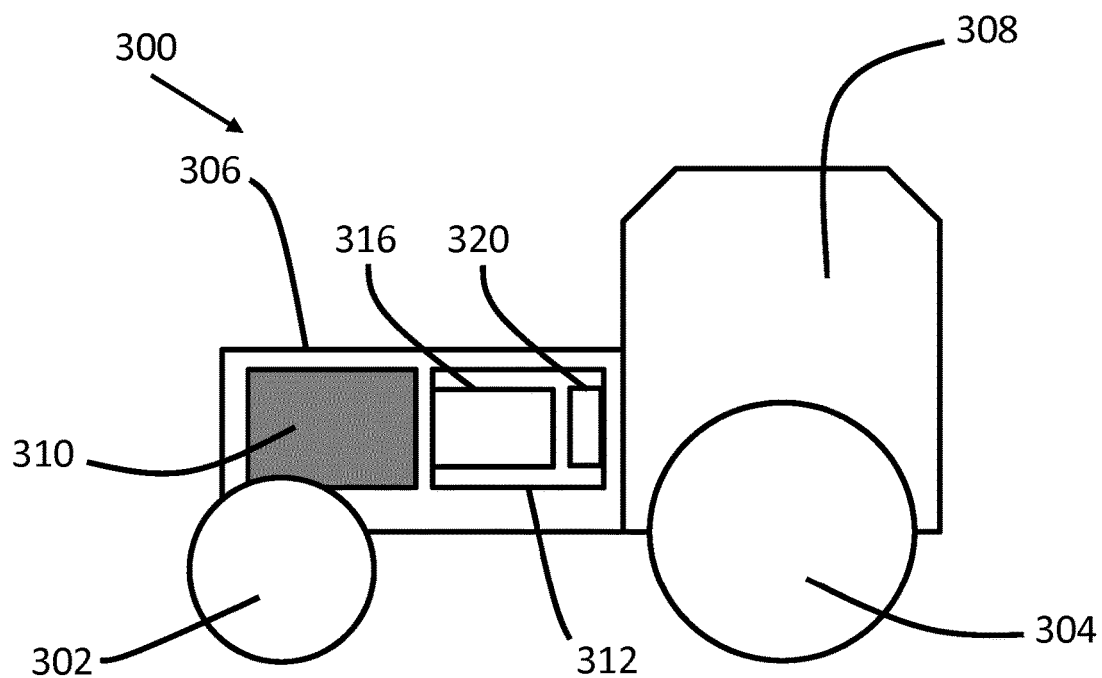
FIG. 6 is a side plan view of an agricultural tractor according to a further embodiment of the invention.
Figure 7:
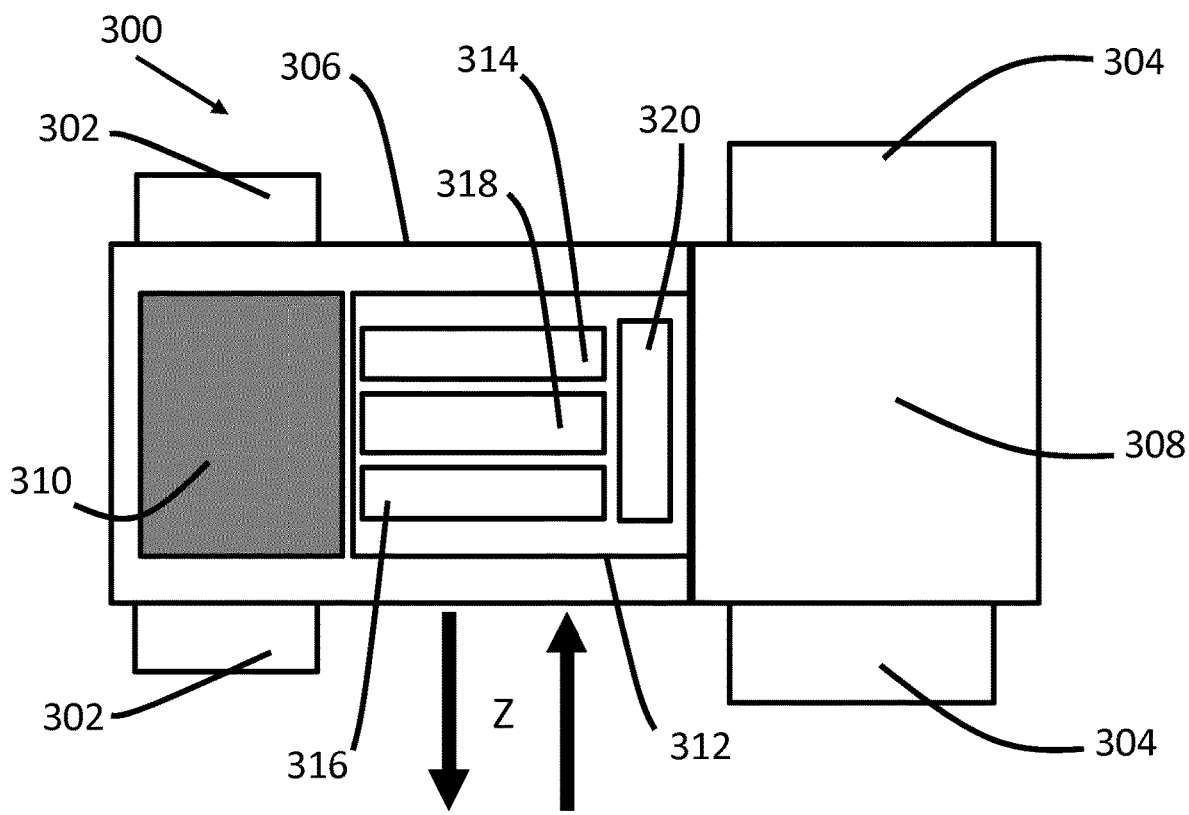
FIG. 7 is a top plan view of the tractor of FIG. 6.

An alternative embodiment is illustrated in FIGS. 6 and 7, where an agricultural tractor is indicated at 300. The tractor 300 comprises front wheels 302, rear wheels 304, an engine section 306 and a cab section 308. An engine 310 is provided in the engine section 306, with a cooling package 312 located adjacent the engine 310. In contrast to the embodiment of FIG. 1, in FIG. 6 the cooling package 312 is positioned between the engine 310 and the cab section 308.

With reference to FIG. 7, the cooling package 312 comprises a first heat exchanger assembly 314, a second heat exchanger assembly 316, and an engine fan 318 arranged between the first and second heat exchanger assemblies 314,316. The cooling package 312 is arranged such that the cooling fan 318 is aligned with the main longitudinal axis of the tractor 10, wherein the rotational axis of the fan 318 is orthogonal to the longitudinal axis. Accordingly, the cooling package 312 provides for a transverse flow of air through the engine section 306 of the tractor 300, as shown by the airflow directions indicated by the arrows at Z. It will be understood that the fan 318 may be controlled by an appropriate ECU (not shown) to provide for forward and reverse flow through the cooling package 312.

This configuration provides numerous advantages to vehicle operation: In one aspect, air which is heated by passing through the heat exchangers 314,316 of the cooling package 312 is no longer directed over the engine 310 itself, thereby preventing unwanted additional heating of the engine 310. In addition, providing for a transverse air flow allows for the flow direction to be easily reversed, e.g. for the purposes of cleaning accumulated dirt and debris from the heat exchangers and associated grilles. Also, the positioning of a longitudinally-aligned cooling package between the engine 310 and the cab section 308 can allow for improved construction of tractor 300, having a reduced-width or "wasp" waist. Such a wasp waist construction can provide increased operator visibility, e.g. towards the front wheels 302 of the tractor 300, and/or improved turning circles of the tractor 300, by providing additional space for the front wheels 302 to be pivoted into.

In the embodiment shown in FIGS. 6 & 7, a CAC 320 is provided as part of the cooling package 312, wherein the CAC 320 is positioned adjacent the fan 318 and the heat exchangers 314,316. The CAC 320 arranged in series with the fan 318 along the longitudinal axis of the vehicle 300, between the fan 318 and the cab section 308. However, it will be understood that the CAC 320 may be positioned in any other suitable alignment. For example, the CAC 320 may be positioned above or below the fan 318. In such a configuration, the CAC 320 can be arranged to lie flat relative to the other components of the cooling package 312. This arrangement may be preferred in an effort to reduce the length of the cooling package 312 in the longitudinal direction of the tractor 300. Alternatively, the CAC 320 may be positioned between the fan 318 and the engine 310.

While the embodiments of FIGS. 6 & 7 show the longitudinally-aligned cooling package 312 positioned between the engine 310 and the cab section 308, it will be understood that such a cooling package may alternatively be arranged at the front of the tractor 300, forward of the engine 310, and aligned to provide transverse airflow through the cooling package 312.

It will be understood that the arrangement of the longitudinally-aligned cooling package may be combined with any or all of the features of the embodiments shown in FIGS. 1-5.

While the above embodiments illustrate a two-pass charge air cooler assembly, wherein airflow is routed through the CAC twice, it will be understood that additional ducts may be used to provide a multi-pass CAC, wherein airflow is routed through the CAC multiple times, in a direction from the outlet side towards the inlet side of the CAC.

The invention provides for a charge air cooler construction and assembly, and the subsequent use of such a system in a cooling package of a vehicle, which provides for improved performance efficiency and reduced volume, when compared to the prior art.

While the above-described embodiment illustrates the construction of a cooling system having a charge air cooler, it will be understood that the principle of the invention may also apply to any cooling system having a heat exchanger with a low internal mass flow compared to an external coolant airflow, where the motivation is to provide outlet temperature of internal fluid flow as close as possible to coolant temperature.

The invention is not limited to the embodiments described herein, and may be modified or adapted without departing from the scope of the present invention.

The invention claimed is:

1. A cooling package for a vehicle, comprising
at least one heat exchanger;
a fan configured to create a first flow of cooling air through the at least one heat exchanger, the fan having a shroud;
a charge air cooler comprising:
an inlet to receive a compressed charge of air;
an outlet to provide the compressed charge of air for use by an engine; and
a charge air cooler body, wherein the charge air cooler body has a plurality of parallel flow tubes directing flow of the compressed charge of air between the inlet and the outlet, the charge air cooler body defining an inlet-side portion of the charge air cooler in a region closest to the inlet and an outlet-side portion of the charge air cooler in a region closest to the outlet; and
a duct, wherein at least a portion of the duct forms part of the shroud for the fan;
wherein the fan is configured to create a second flow of cooling air directed by the flow duct, the second flow of cooling air initially passing through the outlet-side portion of the charge air cooler to cool the compressed charge of air in a portion of the flow tubes in the outlet-side portion of the charge air cooler, the second flow of cooling air subsequently routed by the duct through the inlet-side portion of the charge air cooler to cool the compressed charge of air in a portion of the flow tubes in the inlet-side portion of the charge air cooler.

2. The cooling package of claim 1, wherein the at least one heat exchanger comprises an engine radiator.

3. The cooling package of claim 1, wherein the inlet and the outlet of the charge air cooler are arranged along an axis, the axis extending parallel to a rotational axis of the fan.

4. The cooling package of claim 1, wherein the at least one heat exchanger of the cooling package comprises:
a first heat exchanger located in the first cooling flow of air upstream of the fan;
a second heat exchanger located in the first cooling flow of air downstream of the fan; and
the charge air cooler in fluid connection with the fan, and parallel with the first and second heat exchangers.

5. The cooling package of claim 4, wherein the charge air cooler is located laterally adjacent to a flow path of the first flow of cooling air through the first and second heat exchangers.

6. The cooling package of claim 1, wherein the fan is located in the second flow of cooling air upstream of the flow through the outlet-side portion of the flow tubes of the charge air cooler.

7. The cooling package of claim 1, wherein the fan is located downstream of flow to the inlet-side portion of the flow tubes of the charge air cooler, the fan configured to draw a flow of air through the outlet-side portion of the charge air cooler, the flow of air subsequently routed to flow through the inlet-side portion of the charge air cooler.

8. The cooling package of claim 1, wherein the fan is located in the second flow of cooling air downstream of the outlet-side portion of the charge air cooler and the inlet-side portion of the charge air cooler, wherein the fan is configured to draw the second flow of cooling air through the outlet-side portion of the charge air cooler and to subsequently draw the second flow of cooling air through the inlet-side portion of the charge air cooler.

9. The cooling package of claim 1, wherein the fan is located in the second flaw of cooling air upstream of the outlet-side portion of the charge air cooler and the inlet-side portion of the charge air cooler, wherein the fan is configured to blow the second flow of cooling air through the outlet-side portion of the charge air cooler and to subsequently blow the second flow of cooling air through the inlet-side portion of the charge air cooler.

10. A cooling package for a vehicle, comprising
at least one heat exchanger;
a fan configured to create a first flow of cooling air through the at least one heat exchanger, the fan having a shroud;
a charge air cooler comprising:
an inlet to receive a compressed charge of air;
an outlet to provide the compressed charge of air for use by an engine; and
a charge air cooler body, wherein the charge air cooler body has a plurality of parallel flow paths tubes directing flow of the compressed charge of air between the inlet and the outlet, the charge air cooler body plurality of parallel flow paths defining an inlet-side portion of the charge air cooler in a region closest to the inlet and an outlet-side portion of the charge air cooler in a region closest to the outlet; and
a duct, wherein at least a portion of the duct forms part of the shroud for the fan;
wherein the fan is configured to create a second flow of cooling air directed by the duct, the second flow of cooling air initially passing through the outlet-side portion of the charge air cooler, to cool the compressed charge of air in a portion of the flow tubes in the outlet-side portion of the charge air cooler, the second flow of cooling air subsequently routed by the duct through the inlet-side portion of the charge air cooler to cool the compressed charge of air in a portion of the flow tubes in the inlet-side portion of the charge air cooler,
wherein the fan is located in the second flow of cooling air downstream of the outlet-side portion of the charge air cooler and in the second flow of cooling air upstream of the inlet-side portion of the charge air cooler, wherein the fan is configured to draw the second flow of cooling air through the outlet-side portion of the charge air cooler and to subsequently blow the second flow of cooling air through the inlet-side portion of the charge air cooler.

11. The cooling package of claim 10, wherein the fan is configured such that a portion of an area swept by the fan extends into a space defined by the duct located adjacent the charge air cooler.

* * * * *